US012588118B2

(12) United States Patent
Cheng

(10) Patent No.: US 12,588,118 B2
(45) Date of Patent: Mar. 24, 2026

(54) CONTROL CIRCUIT FOR DRIVING DIFFERENT COLOR TEMPERATURE LED LIGHTS WITH AC INPUT VOLTAGE

(71) Applicant: GU YUAN OPTOELECTRONIC TECHNOLOGY (SHANGHAI) CO., LTD, Shanghai (CN)

(72) Inventor: Yawen Cheng, Shanghai (CN)

(73) Assignee: GU YUAN OPTOELECTRONIC TECHNOLOGY (SHANGHAI) CO., LTD, Shanghai (CN)

( * ) Notice: Subject to any disclaimer, the term of this patent is extended or adjusted under 35 U.S.C. 154(b) by 84 days.

(21) Appl. No.: 18/609,110

(22) Filed: Mar. 19, 2024

(65) Prior Publication Data

US 2025/0142696 A1    May 1, 2025

(51) Int. Cl.
*H05B 45/20* (2020.01)
*H05B 45/345* (2020.01)
*H05B 47/155* (2020.01)

(52) U.S. Cl.
CPC ........... *H05B 45/20* (2020.01); *H05B 45/345* (2020.01); *H05B 47/155* (2020.01)

(58) Field of Classification Search
CPC .... H05B 45/20; H05B 45/345; H05B 47/155; H05B 45/46; H05B 45/30; H05B 45/37; H05B 45/3725; H05B 45/40
See application file for complete search history.

(56) References Cited

U.S. PATENT DOCUMENTS 10,159,131 B1 * 12/2018 Chaimberg ............ H05B 45/46
10,531,534 B1 * 1/2020 Zhou ...................... H05B 45/20
2020/0214096 A1 * 7/2020 Peng ...................... H05B 45/00
2022/0279636 A1 * 9/2022 Zijlman ................. H05B 45/34

FOREIGN PATENT DOCUMENTS

CN 114175858 A * 3/2022 ............ H05B 45/46

* cited by examiner

*Primary Examiner* — Abdullah A Riyami
*Assistant Examiner* — Syed M Kaiser
(74) *Attorney, Agent, or Firm* — Kenneth Q. Lao; WARE FRESSOLA MAGUIRE & BARBER LLP

(57) ABSTRACT

A control circuit for driving different color temperatures LED lights with AC input voltage comprises a LED light set A with one color temperature; and a LED light set B with another color temperature; two AC input voltages L1 and L2; wherein the LED light sets A and B are arranged in parallel. Two different color temperatures LED light sets are used to generate three different color temperatures LED lights sources, which meets the requirement for using different LED color temperature light sources in different scenarios to reduce the inventory of different LED lights.

5 Claims, 3 Drawing Sheets

CONTROL CIRCUIT FOR DRIVING DIFFERENT COLOR TEMPERATURE LED LIGHTS WITH AC INPUT VOLTAGE

TECHNICAL FIELD

The present invention relates to LED lighting; and in particular to a control circuit for driving different color temperatures LED lights with AC input voltage.

BACKGROUND OF THE INVENTION

LED has the characteristics of energy conservation, environmental protection, long service life, small size, rich colors, flexible combination, strong vibration resistance, and no noise. LED lights are currently recognized as one of the environmentally friendly light sources. With the popularization of LED technology, LED lights have enriched the lighting market and made the functions of lighting more diversified. With the development of social productivity and the continuous improvement of people's living standards, the demand for LED lights with different color temperatures in different scenarios is also increasing.

Because different scenarios require LED lights (or modules) with different color temperatures, there are too many kinds of LED lights which led to the problem of overproduction and excessive storage for manufacturers and difficulty in on-site installation.

SUMMARY OF THE INVENTION

The purpose of the present invention is to meet the requirement of using LED lights with different color temperatures in different scenarios. For this purpose, the present invention provides a control circuit for driving different color temperatures LED lights with AC input voltage, comprising: a LED light set A with one color temperature; and a LED light set B with another color temperature; two AC input voltages L1 and L2; wherein the LED light sets A and B are arranged in parallel; the positive pole of the LED light sets A and B are connected with the output of a step-down and constant current source circuit; the negative pole of the LED light set A is connected with the anodes of switch Q1, the negative pole of the LED light set B is connected with the anodes of switch Q2, the cathodes of the switches Q1 and Q2 are connected with the output of a step-down and constant current source circuit; the two switches Q1 and Q2 are arranged in parallel and controlled by a control circuit; wherein the control circuit drives either or both of the LED light sets A and B by the two switches Q1 and Q2, thus to generate three different color temperatures.

In some embodiments, the control circuits comprising: two half-wave rectifier circuits; two optical couplers OT1 and OT2; wherein the first half-wave rectifier circuit and an optical coupler OT1 are arranged between the AC input voltage L1 and the switch Q1 to control the switch Q1; and the second half-wave rectifier circuit and another optical coupler OT2 are arranged between the AC input voltage L2 and the switch Q2 to control the switch Q2.

In some embodiments, when the AC input voltage L1 is connected to the first half-wave rectifier circuit, the control circuit turn on the switch Q1 to drive the LED light set A; when the AC input voltage L2 is connected to the second half-wave rectifier circuit, the control circuit turn on the switch Q2 to drive the LED light set B; and when both AC input voltage L1 and L2 are connected to the first and second half-wave rectifier circuit, the control circuit turn on both switches Q1 and Q2 to drive both LED light sets A and B.

In some embodiments, when the AC input voltage L1 is connected to the control circuit, the control circuit turn on the LED light set A to generate the first color temperature; when the AC input voltage L2 is connected to the control circuit, the control circuit turn on the LED light set B to generate the second color temperature; and when both AC input voltages L1 and L2 are connected to the control circuit, the control circuit turn on both LED light sets A and B to generate the mixed third color temperature.

In some embodiments, the LED light set A is composed of a set of LED beads with one color temperature; and the LED light set B is composed of a set of LED beads with another color temperature.

In some embodiments, the control circuit drives two or more LED light sets with the same number of AC input voltages to generate three or more different color temperature.

The advantage of the present invention is using two different color temperatures LED light sets to generate three different color temperatures LED lights sources, which meets the requirement for using different LED color temperature light sources in different scenarios. Therefor manufacturers can reduce the inventory of different LED lights to save costs and to be more manageable. The usages can switch different color temperatures in different environmental scenarios which can enrich user experience.

EXPLANATION OF REFERENCE SIGNS

1—Input circuit;
2—output of the step-down and constant current source circuit;
3—LED light sets with different color temperatures;
4—control circuit.

DETAILED DESCRIPTION OF THE INVENTION

Figure 1:
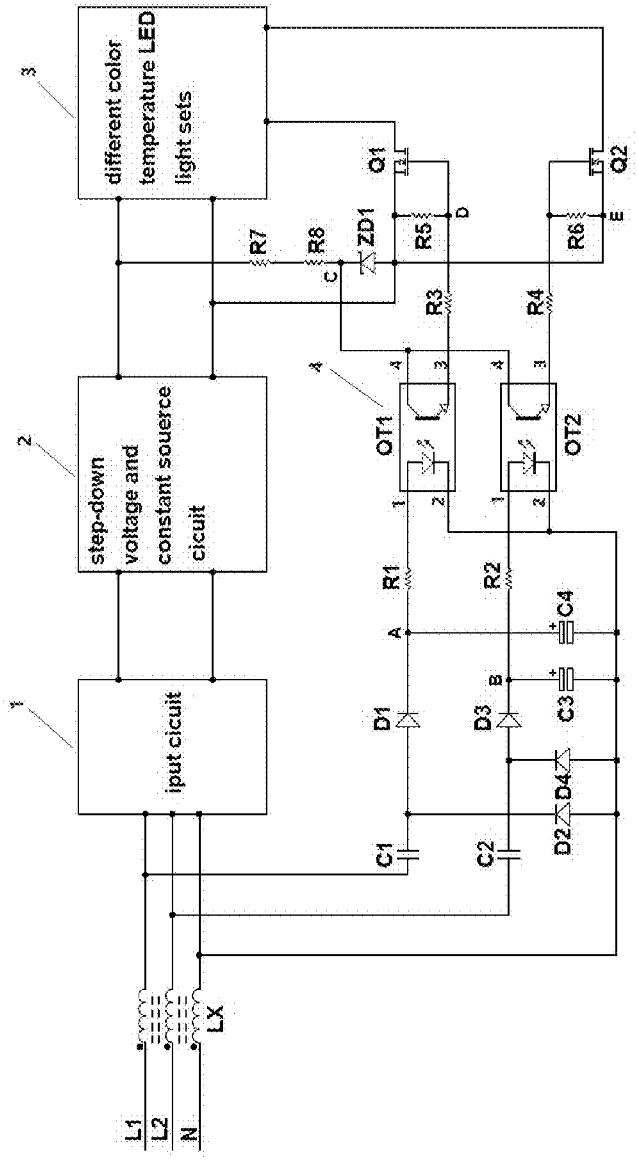
FIG. 1 is an electrical block diagram of a control circuit for driving different color temperatures LED lights with AC input voltage, in an embodiment of the present invention.
Figure 2:
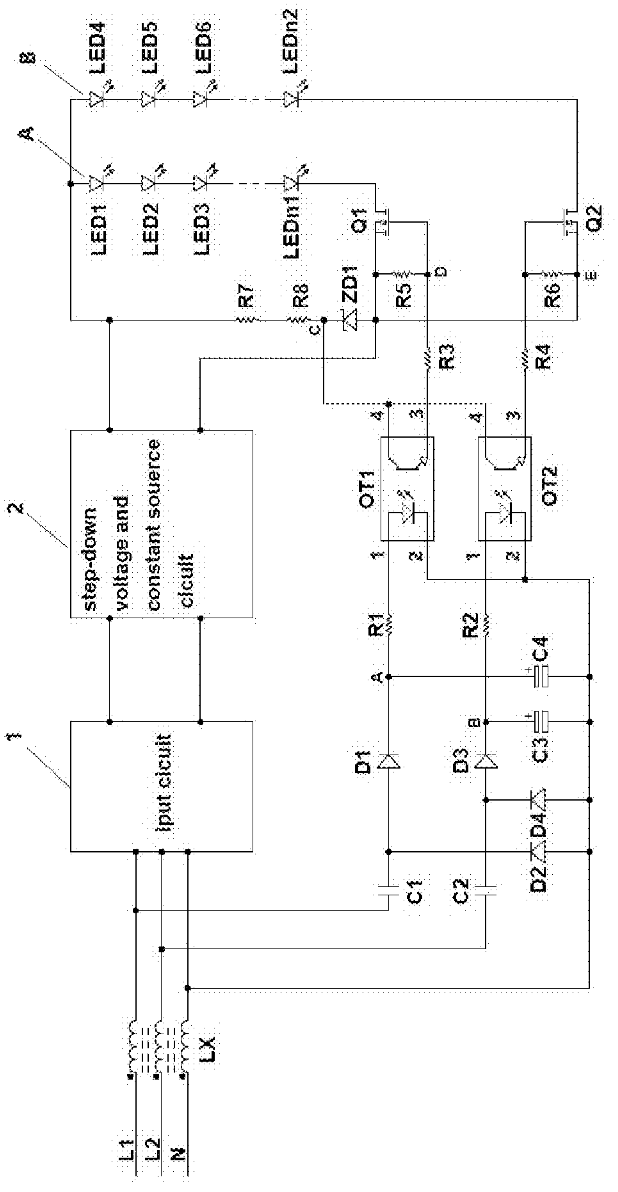
FIG. 2 is a circuit schematic diagram of a control circuit for driving different color temperatures LED lights with AC input voltage, in an embodiment of the present invention.
Figure 3:
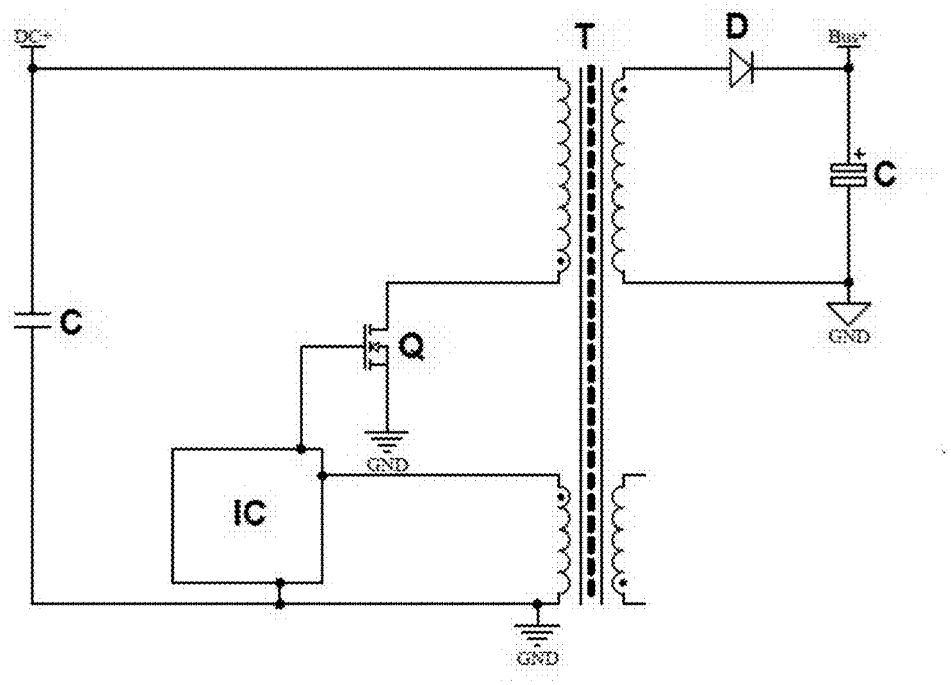
FIG. 3 a circuit schematic diagram of the output of the step-down and constant current source circuit, in an embodiment of the present invention.

With reference to FIGS. 1, 2, and 3, the input of input circuit 1 is connected with:

L1: Live Wire
input AC voltage L1: live Wire;
L2: Live Wire;
input AC voltage L2: live Wire;
N: Neutral Wire;
LX: three winding common mode inductance;

Input circuit 1 is composed of rectification and filtering circuit and EMI circuit, etc., to output DC voltage.

With reference to FIG. 3, the step-down and constant current source circuit is composed of a chip IC (model IW3627), MOS transistor Q, transformer T, rectifier transistor D and filter capacitor C, to output a constant current source voltage BUS+.

Two LED light sets A and B with different color temperatures:

The LED light set A is composed of LED beads LED1, LED2, LED3, . . . . LEDn1 with one color temperature.

The LED light set B is composed of LED beads LED 4, LED 5, LED 6, . . . . LEDn2 with another color temperature.

The LED light sets A and B are arranged in parallel. The positive pole of the LED light sets A and B are connected with the output of the step-down and constant current source circuit 2. The negative pole of the LED light set A relates to the anodes of switch Q1. The negative pole of the LED light set B relates to the anodes of switch Q2. The cathodes of the switches Q1 and Q2 are connected with the output of the step-down and constant current source circuit 2.

The Control Circuit:

The AC input voltage L1 is connected with the first half-wave rectifier circuit D1, D2 C4. The output of the first half-wave rectifier circuit D1, D2. C4 is connected to the input of the optical coupler OT1 (model EL817 series) through the current limiting resistors R1. The output of the optical coupler OT1 is connected to the grid electrode of the switch Q1. When the first half-wave rectifier circuit D1, D2. C4 output high level to the optical coupler OT1 to turn on the switch Q1, the negative pole of the LED light set A is connected with the output of the step-down and constant current source circuit 2 to turn on the LED light set A.

The AC input voltage L2 is connected with the first half-wave rectifier circuit D3. D4. C3. The output of the second half-wave rectifier circuit D3, D4. C3 is connected to the input of the optical coupler OT2 (model EL817 series) through the current limiting resistors R2. The output of the optical coupler OT2 is connected to the grid electrode of the switch Q2. When the second half-wave rectifier circuit D3. D4. C3 output high level to the optical coupler OT2 to turn on the switch Q2, the negative pole of the LED light set B is connected with the output of the step-down and constant current source circuit 2 to turn on the LED light set B.

The Working Process is as Follows:

When the AC input voltage L1 and neutral wire N are connected with the electric supply (L2 is disconnected), the electric supply generate a constant voltage at the output of the step-down and constant current source circuit after passing through the rectification and filtering circuit in the input circuit and the step-down and constant current source circuit, then a constant voltage is generated at point C after passing through the current limiting resistors R7, R8 and Zener diode ZD1. At the same time, the electric supply generate a constant voltage at point A after passing through diodes D1,D2 and capacitors C1,C4 in the first half-wave rectifier circuit to drive the LED on the primary side of the optical coupler OT1 after passing through the current limiting resistor R1. After the photo transistor on the secondary side of the optical coupler OT1 receives the optical signal from the primary side and turns it on, the voltage at point C generate a high level at the grid electrode of the switch Q1 to turn on the switch Q1 after being divided by the current limiting resistor R3 and the bias resistor R5, then the LED light set A is lit up to generate the first color temperature.

Similarly, When the AC input voltage L2 and neutral wire N are connected with the electric supply (L1 is disconnected), the LED light set B is lit up to generate the second color temperature.

When both AC input voltages L1 and L2 and neutral wire N relate to the electric supply, both LED light sets A and B are lit up to generate the mixed third color temperature.

In some embodiments, the control circuit drives two or more LED light sets with the same number of AC input voltages to generate three or more different color temperature.

The invention claimed is:

1. A control circuit for driving different color temperatures LED lights with AC input voltage, comprising:

a first LED light set (A) with one color temperature; and a second LED light set (B) with another color temperature;

two AC input voltages (L1 and L2);

wherein the LED light sets (A and B) are arranged in parallel;

the positive pole of the LED light sets (A and B) relate to the output of a step-down and constant current source circuit;

the negative pole of the first LED light set (A) is connected with the anodes of first switch (Q1), the negative pole of the second LED light set (B) is connected with the anodes of second switch (Q2), the cathodes of the switches (Q1 and Q2) are connected with the output of a step-down and constant current source circuit;

the two switches (Q1 and Q2) are arranged in parallel and controlled by a control circuit; wherein the control circuit drives either or both of the LED light sets (A and B) by the two switches (Q1 and Q2), thus to generate three different color temperatures, wherein the control circuit is comprising:

two half-wave rectifier circuits;

two optical couplers (OT1 and OT2);

wherein the first half-wave rectifier circuit and first optical coupler (OT1 are arranged between the AC input voltage (L1) and the switch (Q1) to control the first switch (Q1); and the second half-wave rectifier circuit and second optical coupler (OT2) are arranged between the AC input voltage (L2) and the switch (Q2) to control the second switch (Q2).

2. The control circuit for driving different color temperatures LED lights with AC input voltage according to claim 1, wherein when the AC input voltage (L1) is connected to the first half-wave rectifier circuit, the control circuit turn on the first switch (Q1) to drive the first LED light set (A); when the AC input voltage (L2) is connected to the second half-wave rectifier circuit, the control circuit turn on the second switch (Q2) to drive the second LED light set (B); and when both AC input voltages (L1 and L2) are connected to the first and second half-wave rectifier circuit, the control circuit turn on both switches (Q1 and Q2) to drive both LED light sets (A and B).

3. The control circuit for driving different color temperatures LED lights with AC input voltage according to claim 1, wherein when the AC input voltage (L1) is connected to the control circuit, the control circuit turn on the first LED light set (A) to generate the first color temperature; when the AC input voltage (L2) is connected to the control circuit, the control circuit turn on the second LED light set (B) to generate the second color temperature; and when both AC input voltages (L1 and L2) are connected to the control circuit, the control circuit turn on both LED light sets (A and B) to generate the mixed third color temperature.

4. The control circuit for driving different color temperatures LED lights with AC input voltage according to claim 1, wherein the first LED light set (A) is composed of a set of LED beads with one color temperature; and the LED second light set (B) is composed of a another set of LED beads with another color temperature.

5. The control circuit for driving different color temperatures LED lights with AC input voltage according to claim 1, wherein the control circuit drives two or more LED light sets with the same number of AC input voltages to generate three or more different color temperature.

* * * * *